United States Patent
James et al.

(10) Patent No.: US 6,521,583 B1
(45) Date of Patent: Feb. 18, 2003

(54) COATED SODIUM PERCARBONATE PARTICLES, PROCESS FOR THEIR PREPARATION, THEIR USE IN DETERGENT COMPOSITIONS AND DETERGENT COMPOSITIONS CONTAINING THEM

(75) Inventors: Alun P. James, Liverpool (GB); Graham R. Horne, Warrington (GB); Tom Candy, Warrington (GB); Richard Rösler, Linz/Rhein (DE); Manfred Mathes, Bad Hoenningen (DE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 09/701,780

(22) PCT Filed: Jun. 4, 1999

(86) PCT No.: PCT/EP99/03948

§ 371 (c)(1),
(2), (4) Date: Apr. 16, 2001

(87) PCT Pub. No.: WO99/64350

PCT Pub. Date: Dec. 16, 1999

(30) Foreign Application Priority Data

Jun. 5, 1998 (EP) ............................................ 98304478

(51) Int. Cl.[7] ............................ C11D 17/00; C11D 3/39; C11D 3/12; C11D 3/395; C01B 15/10
(52) U.S. Cl. ........................................ 510/375; 510/442
(58) Field of Search ................................ 510/372, 441, 510/442; 252/186.27, 186.32

(56) References Cited

FOREIGN PATENT DOCUMENTS

| JP | 59/204697 | 11/1984 |
|---|---|---|
| WO | WO96/14389 | 5/1996 |
| WO | WO97/01562 | 1/1997 |
| WO | WO97/35951 | 10/1997 |

*Primary Examiner*—Yogendra N. Gupta
*Assistant Examiner*—John M Petruncio
(74) *Attorney, Agent, or Firm*—Larson & Taylor PLC

(57) ABSTRACT

Coated sodium percarbonate particles are provided which contain a sodium percarbonate core, and a coating layer substantially free from sulate, borate and magnesium compounds, having at least 30 and at most 75% w/w of an alkali metal carbonate and at least 25 and at most 70% w/w of an alkali metal silicate. The alkali metal carbonate and silicate being uniformly dispersed in the coating layer. Also provided is a process for the preparation of the coated sodium percarbonate particles and their use in detergent compositions.

22 Claims, No Drawings

COATED SODIUM PERCARBONATE PARTICLES, PROCESS FOR THEIR PREPARATION, THEIR USE IN DETERGENT COMPOSITIONS AND DETERGENT COMPOSITIONS CONTAINING THEM

FIELD OF THE INVENTION

The present invention is related to coated sodium percarbonate particles, to a process for the preparation of the coated sodium percarbonate particles, to the use of the coated sodium percarbonate particles in detergent compositions and to detergent compositions comprising the coated sodium percarbonate particles.

BACKGROUND OF THE INVENTION

The use of sodium percarbonate (or sodium carbonate peroxyhydrate) as the active bleach constituent in detergent compositions for household fabric washing or dish washing is well known. Commonly such detergent compositions contain among other components zeolites as builder material, enzymes, bleach activators and/or perfumes. However, the interaction between sodium percarbonate and other formulation components leads to progressive decomposition of the percarbonate and hence to loss of bleaching power during storage and transportation of the composition. A number of proposals have been made to overcome this problem by interposing a layer between the sodium percarbonate and its environment, called a coating layer. For instance in the Belgian patent BE 842014 sodium sulfate is used as one of the constituents of the coating layer. In the international patent application WO 96/14389 a magnesium salt is used as one of the constituents of the coating layer. In the patent application JP 59/204697 a borate is used as one of the constituents of the coating layer. These known coating layers do not result in man optimum combination of properties since they do not confer simultaneously a good stability to the sodium percarbonate when present in the detergent composition, a rapid dissolution rate when the composition is used in washing applications and a low moisture affinity when the composition is stored at high humidity.

SUMMARY OF THE INVENTION

The aim of the present invention is to overcome the aforementioned drawback by proposing new coated sodium percarbonate particles presenting simultaneously a good stability, a rapid dissolution rate and a low moisture affinity.

Consequently, the invention concerns coated sodium percarbonate particles containing:

a) a sodium percarbonate core, and
b) a coating layer substantially free from sulfate, borate and magnesium compounds, comprising at least 30 and at most 75% w/w of an alkali metal carbonate and at least 25 and at most 70% w/w of an alkali metal silicate, the alkali metal carbonate and silicate being uniformly dispersed in the coating layer.

By substantially free from sulfate, borate and magnesium compounds is meant less than 5% w/w of the total coating, preferably less than 2% w/w of the total coating, more preferably less than 1% w/w of the total coating, most preferably less than 0.5% w/w of the total coating, of sulfate, borate and/or magnesium compounds.

In a preferred embodiment, the coating layer contains only the alkali metal carbonate and silicate.

One of the essential characteristics of the invention resides in the combination of an alkali metal carbonate with an alkali metal silicate in the coating layer in the given proportions and the substantial absence of sulfate, borate and magnesium compounds in the coating layer. It has indeed been found that this combination confers advantageous properties to the sodium percarbonate which become clear in the following paragraphs.

Another important element of the invention resides in the uniform distribution of the alkali metal carbonate and silicate in the coating layer. This means that it is not possible to determine within the coating layer the presence of parts which contain solely alkali metal carbonate and/or parts which contain solely alkali metal silicate. In other words, the carbonate and the silicate have been applied together to the sodium percarbonate core as a uniform mixture so that they are equally dispersed on the surface of the core particles and that the coating layer comprises a homogeneous mixture of carbonate and silicate.

DETAILED DESCRIPTION OF PREFERRED EMBODIMENTS

The coating layer of the coated sodium percarbonate according to the invention comprises preferably at least 40% w/w of alkali metal carbonate. Advantageously it comprises at most 70% w/w of alkali metal carbonate. Preferably it comprises at least 30% w/w of alkali metal silicate. Advantageously it comprises at most 60% w/w of alkali metal silicate. Coating layers comprising from 40 to 70% w/w of alkali metal carbonate and from 30 to 60% w/w of alkali metal silicate are convenient. It has been observed that low levels of alkali metal carbonate are not desirable because the tackiness of these systems facilitate agglomeration of the coated particles which is undesirable.

Preferably, sodium carbonate and sodium silicate are used as the alkali metal carbonate and silicate.

In the coated sodium percarbonate particles according to the invention the fraction of the coating layer is usually at least 1% w/w. It is in particular at least 2% w/w. The fraction of coating layer is commonly at most 5% w/w. More particularly it is at most 4% w/w. Fractions of coating layer from 1 to 5% w/w of the coated sodium percarbonate, preferably from 2 to 4% w/w are convenient. Fractions of coating layer superior to 5% lead to lowering of Avox and are difficult to achieve in a single coating operation without significant product agglomeration.

The coated sodium percarbonate particles according to the invention present usually an Avox of at least 12% w/w. The Avox is preferably at least 13.9% w/w. The Avox is generally at most 15% w/w. It is in particular at most 14.6% w/w. Avox values from 12 to 15% w/w and preferably from 13.9 to 14.4% w/w are convenient. The highest Avox values are obtained when the coating layer contains at least 50% w/w of alkali metal carbonate. The Avox is the available oxygen found in sodium percarbonate and indicates the amount of oxygen utilizable in a chemical reaction. It is measured by titration with potassium permanganate after dissolution in sulfuric acid (see ISO 1917-1982) according to the following reaction:

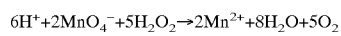

For Avox calculation:

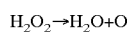

where O represents Avox.

The coated sodium percarbonate particles according to the invention usually have a bulk density of at least 0.9 g/cm³. The bulk density is preferably at least 1.0 g/cm³. It is generally at most 1.2 g/cm³. It is in particular at most 1.1 g/cm³. Bulk densities from 0.9 to 1.2 g/cm³, preferably from 1.0 to 1.1 g/cm³ give good results. The bulk density is measured by recording the mass of sample in a stainless steel cylinder of internal height and diameter of 86.1 mm, after running the sample out of a funnel (upper internal diameter 108 mm, lower internal diameter 40 mm, height 130 mm) placed 50 mm directly above the receiver. The higher levels of alkali metal carbonate in the coating layer ensure that a high bulk density is achieved.

The coated sodium percarbonate particles according to the invention present usually a low rate at which it picks up moisture from a humid atmosphere. The capability to pick up moisture is measured by the following test. A 9 cm diameter petri dish with a 1 cm depth rim is weighed accurately on a 4 decimal place balance (W1). A sample of dry coated sodium percarbonate (about 20 g) is placed on the petri dish which is gently agitated to generate an even particulate layer across the base of the dish and reweighed on the same balance (W2). The sample on the petri dish is stored in a room, about 3 m high, wide and long in an atmosphere maintained for a period of 24 hours at 32° C. by a thermostat controlled heater and at 80% Relative Humidity (RH) by introduction of a fine droplet water spray under the control of a humidity detector and weighed on the same balance (W3). The samples are protected by a shield from the spray. The moisture pick-up of the coated sodium percarbonate is calculated as follows:

$$\text{Moisture Pick-up (g/kg)} = \frac{1000 \times (W3 - W2)}{(W2 - W1)}$$

The coated sodium percarbonate particles according to the invention have usually a moisture pick-up of at least 10 g/kg. It is in particular at least 15 g/kg. More specifically it is at least 20 g/kg. The moisture pick-up is generally at most 100 g/kg. Preferably it is at most 70 g/kg. More preferably it is at most 50 g/kg. Moisture pick-up values from 10 to 100 g/kg, preferably from 15 to 70 g/kg, and most preferably from 20 to 50 g/kg give good results. It has been observed that high levels of alkali metal carbonate in the coating layer lead to low moisture affinity.

The coated sodium percarbonate particles according to the invention have usually a 90% dissolution time of at least 0.5 min. It is in particular at least 0.9 min. Generally the 90% dissolution time is at most 3 min. It is preferably at most 2.5 min. 90% dissolution times from 0.5 to 3 min, preferably from 0.9 to 2.5 min give good results. The 90% dissolution time is the time taken for conductivity to achieve 90% of its final value after addition of coated sodium percarbonate to water at 15° C. and 2 g/l concentration. The method used is adapted from ISO 3123-1976 for industrial perborates, the only differences being the stirrer height that is 1 mm from the beaker bottom and a 2 liter beaker (internal height 183 mm, internal diameter 127 mm). High levels of alkali metal carbonate in the coating layer, preferably at least 70% w/w, lead to rapid dissolution which is desirable. This is however not the case when highly alkaline silicate sources are used during coating e.g. where the $SiO_2/Na_2O$ molar ratio is 1.0 or less. In this case the high alkalinity ensures rapid dissolution.

The coated sodium percarbonate particles according to the invention usually have an attrition measured according to the ISO standard method 5937-1980 of at least 0.05%. The attrition is in particular at least 0.1%. Attrition values of at most 5% are usual. Values of at most 4% are preferred. Attrition values from 0.05 to 5%, preferably from 0.1 to 4% are convenient.

The coated sodium percarbonate particles according to the invention usually present a thermal stability, measured using microcalorimetry at 40° C., of at least 0.1 $\mu$W/g. The thermal stability is advantageously at least 0.2 $\mu$W/g. It is most preferably at least 0.3 $\mu$W/g. It is generally at most 12 $\infty$W/g. More particularly, it is at most 4 $\mu$W/g. Values of at most 3 $\mu$W/g give the best results. Thermal stabilities from 0.1 to 12 $\mu$W/g, preferably from 0.2 to 4 $\mu$W/g, most preferably from 0.3 to 3 $\mu$W/g, give good results. The measurement of thermal stability consists of using the heat flow or heat leakage principle using a LKB 2277 Bio Activity Monitor. The heat flow between an ampule containing the coated sodium percarbonate and a temperature controlled water bath is measured and compared to a reference material with a known heat of reaction.

The coated sodium percarbonate particles according to the invention usually present a mean particle size of at least 500 $\mu$m. The mean particle size is advantageously at least 550 $\mu$m. It is generally at most 900 $\mu$m. Preferably it is at most 850 $\mu$m. Mean particle sizes from 500 to 900 $\mu$m, preferably from 550 to 850 $\mu$m give good results.

The coated sodium percarbonate particles according to the invention usually present a specific surface area of at least 2 m²/kg. It is in particular at least 3 m²/kg. The specific surface area is generally at most 6 m²/kg. It is preferably at most 5.3 m²/kg. Specific surface areas from 2 to 6 m²/kg, preferably from 3 to 5.3 m²/kg give particularly good results. The specific surface area for sodium percarbonate is calculated from sieve analysis using a minimum of 5 sieves on the basis of the following formula:

$$\text{Specific surface area per unit mass } (m^2/kg) = \Sigma_i 3 * w_i / d_i * r_i,$$

where
  $w_i$=the weight fraction of particles in fraction i,
  $d_i$=the particle density of sodium percarbonate (2140 kg/m³),
  $r_i$=the mean radius of particles in fraction i.
The calculation assumes approximately spherical, non-porous particles.

The coated sodium percarbonate particles according to the invention usually contain a fraction of particles having a particle size superior to 1000 $\mu$m of at most 30% w/w. It is preferably at most 20% w/w. Large fractions above 1000 $\mu$m give rise to unwanted segregation of bleach from a detergent matrix on handling and can have an undesirable appearance. The fraction of particles having a particle size superior to 1000 $\mu$m is usually at least 0.1% w/w.

The sodium percarbonate core can be obtained for example by crystallization from a bulk saturated solution of sodium percarbonate in a crystallizer/classifier. Preferably, the sodium percarbonate core is obtained using a crystallization process without salting-out agent. For instance, the crystallization process described in the international patent application WO 97/01562 of SOLVAY INTEROX, the entire specification of which is incorporated herein by reference, is particularly useful for obtaining such sodium percarbonate core particles. Other sodium percarbonate core particles that are particularly useful as core particles of the invention are those described in the international patent application WO 97/35951 of SOLVAY INTEROX the entire specification of which is incorporated herein by reference.

The coating layer can optionally contain other constituents.

The coated sodium percarbonate according to the invention can be prepared by any known coating process adapted to this purpose. A particularly performant coating process consists in introducing into a mixer uncoated sodium percarbonate core particles and a coating solution obtained by mixing an alkali metal carbonate solution and an alkali metal silicate solution, operating the mixer at a temperature from room temperature to 50° C. in order to distribute the coating solution on the surface of the core particles and to obtain wet coated particles, removing the wet coated particles from the mixer and drying them in a fluid bed dryer using a stream of hot air of a temperature from 50 to 90° C. in order to obtain dry coated particles.

Consequently, the present invention also concerns this process.

In the process according to the invention it can be interesting to operate the mixer at a temperature higher than room temperature in order to maintain the stability of the coating solution and to avoid that the coating constituents crystallise too soon before they are brought into contact with the surface of the sodium percarbonate core particles. This is especially the case when highly alkaline silicate solutions are used.

It is recommended not to use the mother liquor from the crystallization process as coating solution in the process according to the invention.

In the process according to the invention chelating agents can be added to the mixer. These agents can assure chelation of the transition metal ion impurities which are responsible for the decomposition of the sodium percarbonate. Suitable chelating agents can be selected from polycarboxylate or polyphosphonate salts, as such or in acid form. Examples are polyaminocarboxylates such as EDTA or DTPA, polyaminomethylenephosphonates such as EDTMPA, CDTMPA and DTPMPA and hydroxyalkylenephosphonates such as hydroxyethylidenediphosphonate. A convenient amount of chelating agent is often selected from 0.5 to 20 g/kg sodium percarbonate.

The silicate solution used in the process according to the invention are usually characterized by their molar ratio $SiO_2/Na_2O$. This ratio is advantageously at least 1. It is preferably at least 2. Good results have been obtained with molar ratios of up to 4. The best results are obtained with ratios up to 3.3. Molar ratios from 1 to 4 and in particular from 2 to 3.3 are convenient. This molar ratio can be controlled by adding more or less alkaline source for instance NaOH.

The coating solutions used in the process according to the invention usually contain at least 20% w/w of total amount of coating agent (alkali metal silicate and alkali metal carbonate and optionally other agents). Most often it contains at least 25% w/w of coating agent. This amount is generally at most 50% w/w. Amounts of at most 35% w/w are convenient. Amounts of around 30% w/w are preferred. Amounts from 20 to 50% w/w, in particular from 25 to 30% w/w are convenient.

The wet coated particles removed from the mixer advantageously contain 4 to 10% w/w of moisture, advantageously 5 to 8% w/w of moisture. The dried coated particles preferably contain from 0.2 to 0.6% w/w of moisture.

The coated sodium percarbonate particles according to the invention can advantageously be used as active bleach constituent in detergent compositions.

The present invention therefore concerns also the use of the above described coated sodium percarbonate particles as active bleach constituent in detergent compositions.

The present invention also concerns detergent compositions containing the above described coated sodium percarbonate particles as active bleach constituent and a builder, either zeolitic or non-zeolitic. The detergent compositions can also contain other constituents such as surfactants, anti-redeposition and soil suspension agents, bleach activators, optical brightening agents, soil release agents, suds controllers, enzymes, fabric softening agents, perfumes, colors and processing aids. The incorporation of coated percarbonate into detergent powders or granules with a bulk density of 0.4 to 1.0 g/cm$^3$ and into detergent tablets which are either zeolite or phosphate built is particularly advantageous.

EXAMPLE

Sodium percarbonate was manufactured using the continuous aqueous crystallization process free from sodium chloride described in the international patent application WO 97/35806. From this process material with the following properties was generated:

Avox=14.61% w/w

Bulk density=1.03 g/cm$^3$

Moisture pick-up=6 g/kg

90% dissolution time=0.9 min

Attrition=1.5%

Thermal stability=1.7 μW/g

Mean particle size=779 μm.

One kg of this product was placed in a ploughshare mixer operating at around 150 rpm. To the sodium percarbonate was added 103.1 g of a coating solution containing:

200 g/kg anhydrous sodium carbonate, 206.2 g/kg sodium silicate solution which was a 48.5 w/w solids amorphous sodium silicate solution with a $SiO_2/Na_2O$ molar ratio of 2.0, 593.8 g/kg demineralized water.

The coating solution with 30% w/w solids was added over a 2 min period, with a further 3 min mixing. The wet product was then discharged into a fluid bed dryer and fluid bed dried in air for 30 min with a bed temperature of 70° C. The characteristics of the coated sodium percarbonate after treatment was as follows:

Coating: 3% w/w total

Coating composition: 67% sodium carbonate, 33% sodium silicate

Avox=14.01% w/w

Bulk density=1.05 g/cm$^3$

Moisture pick-up=41.3 g/kg

90% dissolution time=2.2 min

Attrition=1.1%

Thermal stability=2.5 μW/g

Mean particle size=772 μm

Calculated specific surface area=4.0 m$^2$/kg

Fraction of material above 1000 μm=16% w/w

In order to assess the effectiveness of the coated sodium percarbonate, two detergent formulations were made by blending coated or uncoated sodium percarbonate with a zeolite 4A built detergent to give the following compositions:

Sodium linear alkyl benzene sulfonate=8.3% w/w

Ethoxylated tallow alcohol=4.4% w/w

Soap=3.1% w/w

Zeolite 4A=27.6% w/w

Sodium carbonate=10.0% w/w

Sodium acrylate/maleate copolymer=4.4% w/w 3.3 molar ratio SiO$_2$/Na$_2$O sodium silicate=2.9% w/w
Carboxymethylcellulose=0.2% w/w
Sodium EDTA=0.2% w/w
Optical brightening agent=0.2% w/w
Sodium sulfate=6.3% w/w
Moisture=10.4% w/w
Coated or uncoated sodium percarbonate=15.0% w/w The 2 formulations generated were stored in sealed polyethylene coated cardboard cartons at 32° C. and 80% RH for a period of 6 weeks. The Avox was monitored using potassium permanganate titration during this stability trial. The following results were generated

| Sodium percarbonate | % Avox recovery = $\frac{\text{Avox after x weeks}}{\text{initial Avox}} \times 100$ | | |
|---|---|---|---|
| | x = 2 | x = 4 | x = 6 |
| Uncoated | 70 | 51 | 43 |
| Coated | 78 | 65 | 53 |

The effectiveness of the coated percarbonate was also assessed by blending coated or uncoated sodium percarbonate with a sodium tripolyphosphate built detergent to give the following compositions:

Sodium linear alkyl benzene sulfonate=6.8% w/w
Ethoxylated tallow alcohol=2.5% w/w
Soap=3.0% w/w
Sodium tripolyphosphate=37.2% w/w
3.3 molar ratio SiO$_2$/Na$_2$O sodium silicate=6.4% w/w
Magnesium silicate=1.6% w/w
Carboxymethylcellulose=1.0% w/w
Sodium EDTA=0.2% w/w
Sodium sulfate=18.0% w/w
Moisture=8.3% w/w
Coated or uncoated sodium percarbonate=15.0% w/w.

What is claimed is:

1. Coated sodium percarbonate particles comprising:
   a) a sodium percarbonate core, and
   b) a coating layer substantially free from sulfate, borate and magnesium compounds, comprising at least 30 and at most 75% w/w of an alkali metal carbonate and at least 25 and at most 70% w/w of an alkali metal silicate, the coating layer being obtained by using the alkali metal carbonate and silicate simultaneously in the form of a coating solution in order to obtain a uniform dispersion of the alkali metal carbonate and the alkali metal silicate in the coating layer, said coating solution being free from a suspension of carbonate and silicate.

2. The coated sodium percarbonate particles according to claim 1 wherein the coating layer comprises from 40 to 70% w/w of alkali metal carbonate and from 30 to 60% w/w of alkali metal silicate and wherein the fraction of coating layer is from 1 to 5% w/w of the coated sodium percarbonate.

3. The coated sodium percarbonate particles according to claim 1 further comprise an Avox from 12 to 15% w/w, a bulk density from 0.9 to 1.2 g/cm$^3$, and a moisture pick-up from 10 to 100 g/kg.

4. The coated sodium percarbonate particles according to claim 1 further comprise a 90% dissolution time from 0.5 to 3 min, an attrition, measured according to the ISO standard method 5937-1980, from 0.05 to 5%, and a thermal stability, measured using microcalorimetry at 40° C., from 0.1 to 12 $\mu$W/g.

5. The coated sodium percarbonate particles according to claim 1 further comprise a mean particle size from 500 to 900 $\mu$m, a surface area from 2 to 6 m$^2$/kg, and containing a fraction of particles having a particle size superior to 1000 $\mu$m of at most 30% w/w.

6. The coated sodium percarbonate particles according to claim 1 wherein the sodium percarbonate core is obtained using a crystallization process without salting-out agent.

7. A process for preparing the coated sodium percarbonate particles of claim 1 from uncoated sodium percarbonate core particles and a coating solution, said process comprising:

mixing an alkali metal carbonate solution and an alkali metal silicate solution which are introduced into a mixer;

operating the mixer at a temperature from room temperature to 50° C. in order to distribute the coating solution on the surface of the core particles and to obtain wet coated particles;

removing the wet coated particles from the mixer; and drying the wet coated particles in a fluid bed dryer using a stream of hot air of a temperature from 50 to 90° C. in order to obtain dry coated particles.

8. The process according to claim 7 wherein the alkali metal silicate solution is a sodium silicate solution having a molar ratio SiO$_2$/Na$_2$O from 1 to 4.

9. A method of enhancing bleaching power of a detergent composition comprising adding the coated sodium percarbonate particles of claim 1 as an active bleach constituent to said detergent composition.

10. Detergent compositions containing the coated sodium percarbonate particles of claim 1 as active bleach constituent and a zeolitic builder.

11. Detergent compositions containing the coated sodium percarbonate particles of claim 1 as active bleach constituent and a non-zeolitic builder.

12. The coated sodium pecarbonate particles according to claim 2, wherein the fraction of coating layer is from 2 to 4% w/w of the coated sodium percarbonate.

13. The coated sodium percarbonate particles according to claim 3 wherein the Avox is form 13.9 to 14.4% w/w.

14. The coated sodium percarbonate particles according to claim 3, wherein the bulk density is from 1.0 to 1.1 g/cm$^3$.

15. The coated sodium percarbonate particles according to claim 3, wherein the moisture pick-up is from 15 to 70 g/kg.

16. The coated sodium percarbonate particles according to claim 4, wherein the dissolution time is from 0.9 to 2.5 min.

17. The coated sodium percarbonate particles according to claim 4, wherein the attrition is from 0.1 to 4%.

18. The coated sodium percarbonate particles according to claim 4, wherein the thermal stability is from 0.2 to 4 $\mu$W/g.

19. The coated sodium percarbonate particles according to claim 5, wherein the mean particle size is from 550 to 850 $\mu$m.

20. The coated sodium percarbonate particles according to claim 5, wherein the surface area is from 3 to 5.3 m$^2$/kg.

21. The coated sodium percarbonate particles according to claim 5, wherein the fraction of particles having a particle size superior to 1000 $\mu$m is at most 20% w/w.

22. The process according to claim 8, wherein the molar ratio of SiO$_2$/Na$_2$O is from 2 to 3.3.

* * * * *